(12) United States Patent
Kusaka et al.

(10) Patent No.: US 8,681,397 B2
(45) Date of Patent: Mar. 25, 2014

(54) ERECTING EQUAL-MAGNIFICATION LENS ARRAY PLATE, OPTICAL SCANNING UNIT, AND IMAGE READING DEVICE

(75) Inventors: Satoru Kusaka, Minato-ku (JP); Hiroyuki Nemoto, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 28 days.

(21) Appl. No.: 13/571,031

(22) Filed: Aug. 9, 2012

(65) Prior Publication Data
US 2013/0038915 A1  Feb. 14, 2013

(30) Foreign Application Priority Data
Aug. 10, 2011 (JP) ................................. 2011-175427

(51) Int. Cl.
*H04N 1/04* (2006.01)
(52) U.S. Cl.
USPC ............ 358/474; 358/475; 358/509; 358/497
(58) Field of Classification Search
USPC .......................... 358/474, 475, 509, 497, 498
See application file for complete search history.

(56) References Cited

U.S. PATENT DOCUMENTS

| | | | |
|---|---|---|---|
| 8,174,740 B2 * | 5/2012 | Baxter et al. | 358/488 |
| 8,472,118 B2 * | 6/2013 | Guigan et al. | 359/621 |
| 2008/0030570 A1 * | 2/2008 | Nomura et al. | 347/238 |
| 2012/0069430 A1 * | 3/2012 | Yamamura | 359/362 |

FOREIGN PATENT DOCUMENTS

JP  2011-017840 A  1/2011

* cited by examiner

*Primary Examiner* — Houshang Safaipour
(74) *Attorney, Agent, or Firm* — Sughrue Mion, PLLC (57) ABSTRACT

An erecting equal-magnification lens array plate includes: first and second lens array plates; first, second and intermediate light shielding member. The first, second and intermediate light shielding member are halved by a splitting plane parallel with the main scanning direction. One of the first light shielding member pieces, one of the second light shielding member pieces, and one of the intermediate light shielding member pieces produced by halving the members are integrated to form a first holder piece. The other of the first light shielding member pieces, the other of the second light shielding member pieces, and the other of the intermediate light shielding member pieces produced by halving the members are integrated to form a second holder piece. The erecting equal-magnification lens array plate is assembled by sandwiching the first lens array plate and the second lens array plate by the first holder piece and the second holder piece.

5 Claims, 8 Drawing Sheets

FIG.8C

ERECTING EQUAL-MAGNIFICATION LENS ARRAY PLATE, OPTICAL SCANNING UNIT, AND IMAGE READING DEVICE

BACKGROUND OF THE INVENTION

1. Field of the Invention

The present invention relates to an erecting equal-magnification lens array plate used in image reading devices and image forming devices.

2. Description of the Related Art

Some image reading devices such as scanners are known to use erecting equal-magnification optics. Erecting equal-magnification optics are capable of reducing the size of devices better than reduction optics. In the case of image reading devices, an erecting equal-magnification optical system comprises a linear light source, an erecting equal-magnification lens array, and a linear image sensor.

In the related art, a rod lens array capable of forming an erect equal-magnification image is used as an erecting equal-magnification lens array in an erecting equal-magnification optical system. Recently, however, there is proposed an erecting equal-magnification lens array plate comprising a stack of two transparent lens array plates built such that the optical axes of individual convex lenses are aligned, where each transparent lens array plate includes a systematic arrangement of micro-convex lenses on both surfaces of the plate. Since an erecting equal-magnification lens array plate such as this comprises a stack of lens array plates that can be formed by, for example, injection molding, an erecting equal-magnification lens array can be manufactured at a relatively low cost.

An erecting equal-magnification lens array plate lacks a wall for beam isolation between adjacent lenses. Therefore, there is a problem in that a light beam diagonally incident on an erecting equal-magnification lens array plate travels diagonally inside the plate and enters an adjacent convex lens, creating noise (referred to as ghost) as it leaves the plate. Light that does not contribute to imaging and that forms ghost is called stray light.

In one relate-art measure to address stray light, a light shielding member is provided to sandwich two lens array plates and a light shielding member is provided between the two lens array plates (see, for example, patent document No. 1). A through hole is provided in each light shielding member to pass imaging light.

[patent document No. 1] JP2011-17840

In a system where a stack of two of lens array plates and three light shielding members is built so as to form an erecting equal-magnification lens array plate, optical performance (resolution, in-plane distribution of resolution, stray light shield) as designed may not be obtained unless the optical axis of the convex lenses of the lens array plates and the central axes of the through holes are aligned.

SUMMARY OF THE INVENTION

The present invention addresses the aforementioned problem and a purpose thereof is to provide an erecting equal-magnification lens array plate capable of improving optical performance.

In order to address the aforementioned problem, the erecting equal-magnification lens array plate comprises: a first lens array plate in which a plurality of lenses are provided on both surface of the plate along the main scanning direction; a second lens array plate in which a plurality of lenses are provided on both surface of the plate along the main scanning direction and which is provided to face the first lens array plate; a first light shielding member provided on the first lens array plate and provided with a plurality of first through holes located to directly face the lenses on one surface of the first lens array plate; a second light shielding member provided on the second lens array plate and provided with a plurality of second through holes located to directly face the lenses on one surface of the second lens array plate; and an intermediate light shielding member provided between the first lens array plate and the second lens array plate and provided with a plurality of intermediate through holes located to directly face the lenses on the other surface of the first lens array plate and the lenses on the other surface of the second lens array plate. The first light shielding member, the second light shielding member, and the intermediate light shielding member are divided into two pieces by a splitting plane parallel with the main scanning direction, one of the first light shielding member pieces, one of the second light shielding member pieces, and one of the intermediate light shielding member pieces produced by dividing the members into two pieces are integrated to form a first holder piece, and the other of the first light shielding member pieces, the other of the second light shielding member pieces, and the other of the intermediate light shielding member pieces produced by dividing the members into two pieces are integrated to form a second holder piece. The erecting equal-magnification lens array plate 11 is assembled by sandwiching the first lens array plate and the second lens array plate by the first holder piece and the second holder piece.

The splitting plane may pass through the center of the first through hole, the second through hole, and the intermediate through hole.

Grooves for scattering incident light may be formed in the interior wall of the first through hole, second through hole, and the intermediate through hole.

Another embodiment of the present invention relates to an optical scanning unit comprising: a linear light source configured to illuminate a document to be read; the aforementioned erecting equal-magnification lens array plate configured to condense light reflected by the document to be read; and a linear image sensor configured to receive light transmitted by the erecting equal-magnification lens array plate.

Still another embodiment of the present invention relates to an image reading device comprising: the aforementioned optical scanning unit; and an image processing unit configured to process an image signal detected by the optical scanning unit.

DETAILED DESCRIPTION OF THE INVENTION

The invention will now be described by reference to the preferred embodiments. This does not intend to limit the scope of the present invention, but to exemplify the invention.

A description will be given of the erecting equal-magnification lens array plate according to the embodiment.

Figure 1:
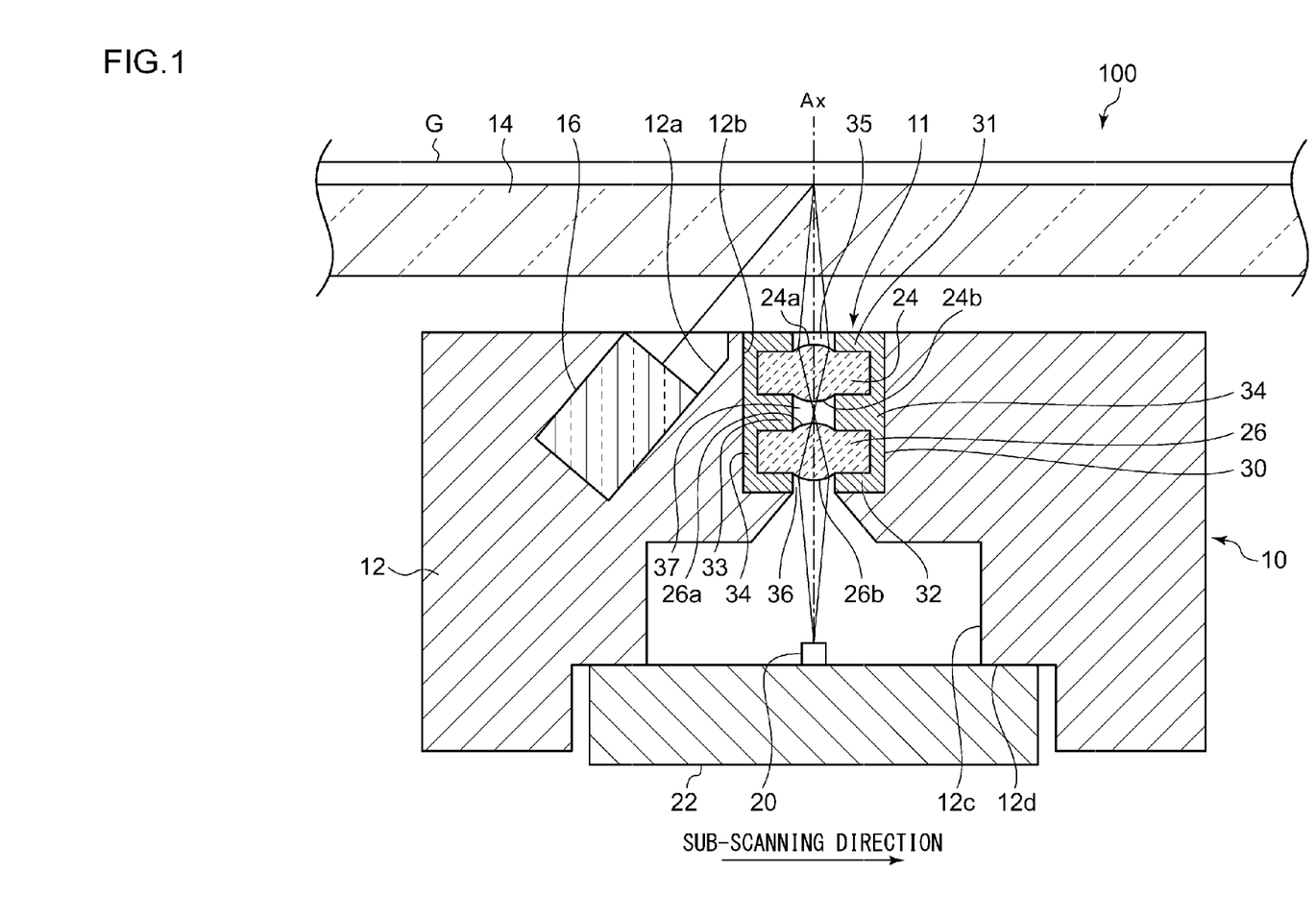
FIG. 1 shows an image reading device in which an erecting equal-magnification lens array plate is used.

FIG. 1 shows an image reading device 100 in which an erecting equal-magnification lens array plate is used. As shown in FIG. 1, the image reading device 100 comprises an optical scanning unit 10, a glass plate 14 on which a document G is placed, a driving mechanism (not shown) for driving the optical scanning unit 10, and an image processing unit (not shown) for processing data read by the optical scanning unit 10.

The optical scanning unit 10 comprises a linear light source 16 for illuminating a document G placed on the glass plate 14, an erecting equal-magnification lens array plate 11 for condensing light reflected from the document G, a linear image sensor (photoelectric transducer) 20 for receiving light condensed by the erecting equal-magnification lens array plate 11, and a housing 12 for housing the linear light source 16, the erecting equal-magnification lens array plate 11, and the linear image sensor 20.

The housing 12 is substantially rectangular solid in shape. A first recess 12a and a second recess 12b are formed in the upper part of the housing 12 and a third recess 12c is formed in the lower part. The housing 12 is formed by injection-molding with resin. By forming the housing 12 by injection molding, the housing 12 can be formed easily at a low cost. The linear light source 16 is diagonally fixed inside the first recess 12a. The linear light source 16 is secured such that the optical axis of the illuminating light passes through the intersection of the optical axis Ax of the erecting equal-magnification lens array plate 11 and the top surface of the glass plate 14.

The erecting equal-magnification lens array plate 11 is fitted in the second recess 12b. A substrate 22 provided with the linear image sensor 20 is fitted in the third recess 12c. The substrate 22 is secured such that the top surface thereof is in contact with a step 12d provided in the third recess 12c.

The erecting equal-magnification lens array plate 11 comprises a stack of a first lens array plate 24 and a second lens array plate 26 built such that pairs of corresponding lenses form a coaxial lens system, where each lens array plate is formed with a plurality of convex lenses on both surfaces of the plate. The first lens array plate 24 and the second lens array plate 26 are held by a holder 30 in a stacked state.

The erecting equal-magnification lens array plate 11 is installed in the image reading device 100 such that the longitudinal direction thereof is aligned with the main scanning direction and the lateral direction thereof is aligned with the sub-scanning direction. The erecting equal-magnification lens array plate 11 is configured to receive linear light reflected from the document G located above and form an erect equal-magnification image on an image plane located below, i.e., a light-receiving surface of the linear image sensor 20. The image reading device 100 can read the document G by scanning document G with the optical scanning unit 10 in the sub-scanning direction.

A detailed description of the erecting equal-magnification lens array plate 11 will be given.

Each of the first lens array plate 24 and the second lens array plate 26 is a rectangular plate and is provided with a plurality of convex lenses on both sides thereof. In other words, a plurality of first lenses 24a are linearly arranged in the main scanning direction (longitudinal direction) on a surface of the first lens array plate 24 toward the glass plate 14, and a plurality of second lenses 24b are linearly arranged in the main scanning direction on a surface toward the linear image sensor 20. A plurality of third lenses 26a are linearly arranged in the main scanning direction on a surface of the second lens array plate toward the glass plate 14, and a plurality of fourth lenses 26b are linearly arranged in the main scanning direction on a surface facing the linear image sensor 20. According to the embodiment, it is assumed that the first lens 24a, the second lens 24b, the third lens 26a, and the fourth lens 26b are spherical in shape. Alternatively, the lenses may have aspherical shapes.

The first lens array plate 24 and the second lens array plate 26 are formed by injection molding. Preferably, each of the first lens array plate 24 and the second lens array plate 26 is formed of a material available to injection molding, having high light transmittance in a desired wavelength range, and having low water absorption. Desired materials include cycloolefin resins, olefin resins, norbornene resins, and polycarbonate.

The first lens array plate 24 and the second lens array plate 26 form a stack such that the second lens 24b and the third lens 26a face each other to ensure that a combination of the first lens 24a, second lens 24b, third lens 26a, and fourth lens 26b aligned with each other form a coaxial lens system. According to the embodiment the second lens 24b and the third lens 26a are spaced apart. Alternatively, the second lens 24b and the third lens 26a may be in contact with each other.

The holder 30 holding the first lens array plate 24 and the second lens array plate 26 comprises a first light shielding member 31, a second light shielding member 32, and an intermediate light shielding member 33. The first light shielding member 31, the second light shielding member 32, and the intermediate light shielding member 33 are rectangular plate members of substantially the same size. The first light shielding member 31, the second light shielding member 32, and the intermediate light shielding member 33 are supported by a support 34 provided at both lateral ends thereof so as to be parallel with each other and spaced apart at a predetermined distance from each other. As shown in FIG. 1, the first light shielding member 31 and the intermediate light shielding member 33 sandwich the first lens array plate 24, and the second light shielding member 32 and the intermediate light shielding member 33 sandwich the second lens array plate 26.

The holder 30 is formed such that the interval between the first light shielding member 31 and the intermediate light shielding member 33 is substantially equal to or slightly larger than the thickness of the first lens array plate 24 so that the first lens array plate 24 can be inserted. The interval between the second light shielding member 32 and the intermediate light shielding member 33 is formed to be substantially equal to or slightly larger than the thickness of the second lens array plate 26 so that the second lens array plate 26 can be inserted.

A plurality of first through holes 35 aligned with the plurality of first lenses 24a of the first lens array plate 24 are formed in the first light shielding member 31. A plurality of second through holes 36 aligned with the plurality of fourth lenses 26b of the second lens array plate 26 are formed in the second light shielding member 32. A plurality of intermediate through holes 37 aligned with the plurality of second lenses 24b of the first lens array plate 24 and the third lenses 26a of the second lens array plate 26 are formed in the intermediate light shielding member 33. The first through holes 35, the second through holes 36, and the intermediate through holes 37 are cylindrical through holes.

The first through holes 35, the second through holes 36, and the intermediate through holes 37 are linearly arranged in the longitudinal direction of the first light shielding member 31, the second light shielding member 32, and the intermediate light shielding member 33, respectively. The central axes of the three corresponding through holes are aligned. The diameter of the first through hole 35, the second through hole 36, and the intermediate through hole 37 is substantially identical to the diameter of the convex lens.

The first light shielding member 31, the second light shielding member 32, the intermediate light shielding member 33, and the support 34 are formed of a light shielding material. Preferably, the shielding material is available to injection molding and is highly capable of shielding light in a required wavelength band. For example, the shielding material may be a black ABS resin.

In a state where the first lens array plate 24 is inserted between the first light shielding member 31 and the intermediate light shielding member 33, the first through holes 35 of the first light shielding member 31 directly face the respective first lenses 24a, the second through holes 36 of the second light shielding member 32 directly face the respective fourth lenses 26b, and the intermediate through holes 37 of the intermediate light shielding member 33 directly face the respective second lenses 24b and third lenses 26a. The optical axes of the corresponding first lens 24a, second lens 24b, third lens 26a, and fourth lens 26b are aligned with the central axes of the corresponding first through hole 35, second through hole 36, and intermediate through hole 37.

By producing the assembly as described above, the area on the surface of the first lens array plate 24 toward the glass plate 14 outside the first lenses 24a is covered by the first light shielding member 31, and the area on the surface toward the linear image sensor 20 outside the second lenses 24b is covered by the intermediate light shielding member 33. The area on the surface of the second lens array plate 26 toward the linear image sensor 20 outside the fourth lenses 26b is covered by the second light shielding member 32, and the area on the surface toward the glass plate 14 outside the third lenses 26a is covered by the intermediate light shielding member 33.

The first light shielding member 31 prevents stray light from entering the first lenses 24a. The second light shielding member 32 prevents stray light from entering the linear image sensor 20. The intermediate light shielding member 33 prevents stray light from entering the third lenses 26a.

As described above, the holder 30 according to the embodiment has the function of holding the first lens array plate 24 and the second lens array plate 26 and the function of preventing stray light from passing through the first lens array plate 24 and the second lens array plate 26. By shielding stray light properly, ghost is prevented from being formed.

Figure 2:
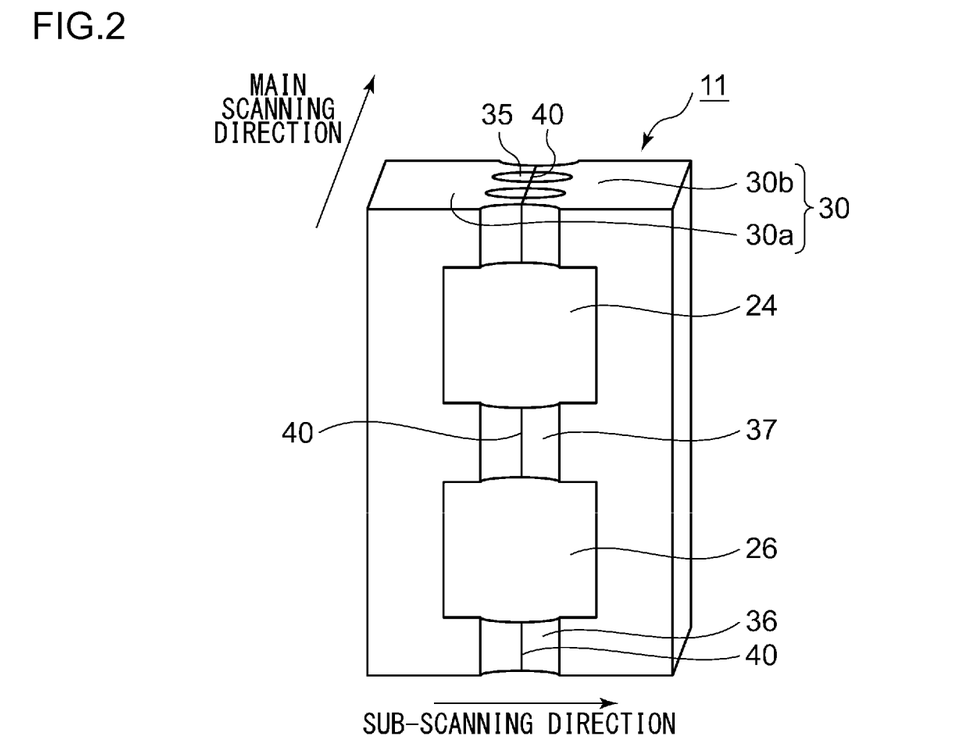
FIG. 2 is a perspective view of the erecting equal-magnification lens array plate according to the embodiment.

FIG. 2 is a perspective view of the erecting equal-magnification lens array plate according to the embodiment. FIG. 2 shows a part of the erecting equal-magnification lens array plate 11 in the main scanning direction (longitudinal direction).

The holder 30 according to the embodiment comprises a first holder piece 30a and a second holder piece 30b produced by dividing the holder 30 into two pieces by a splitting plane 40 parallel with the main scanning direction. The splitting plane 40 passes through the centers of the first through holes 35, the second through holes 36, and the intermediate through holes 37.

Figure 3:
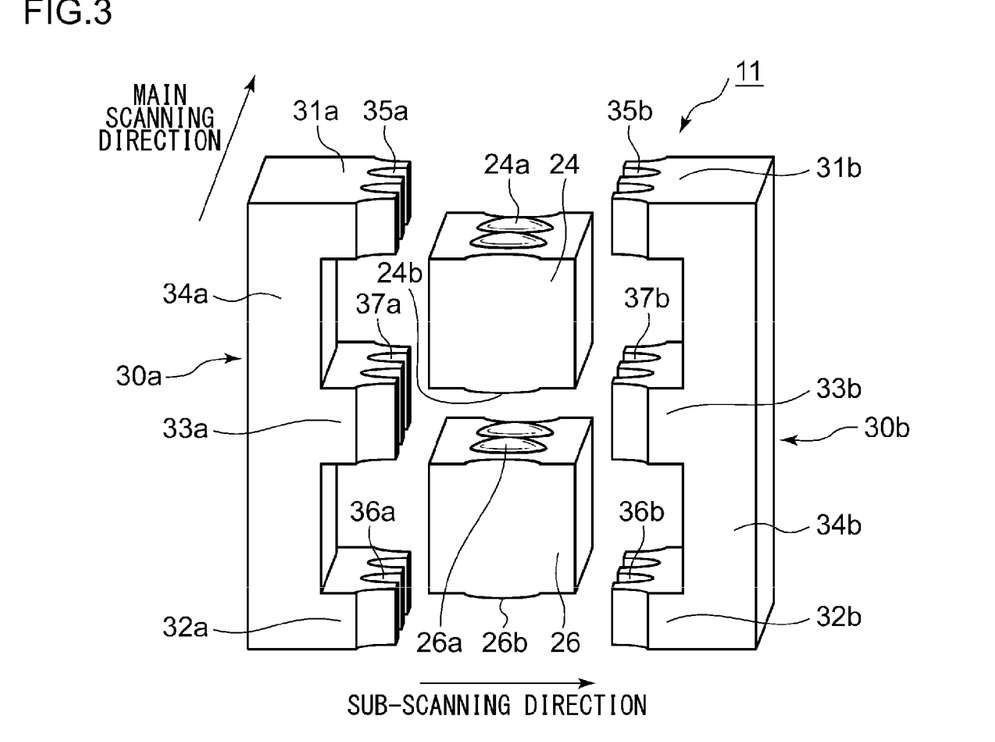
FIG. 3 is an exploded perspective view of the erecting equal-magnification lens array plate according to the embodiment.

FIG. 3 is an exploded perspective view of the erecting equal-magnification lens array plate according to the embodiment. As shown in FIG. 3, the first light shielding member is divided by the splitting plane into first light shielding member pieces 31a and 31b, the second light shielding member is divided by the splitting plane into second light shielding member pieces 32a and 32b, and the intermediate light shielding member is halve by the splitting plane into intermediate light shielding member pieces 33a and 33b. The first through hole 35 is divided by the splitting plane into first through hole portions 35a and 35b, the second through hole 36 is divided by the splitting plane into second through hole portions 36a and 36b, and the intermediate through hole 37 is divided by the splitting plane into intermediate through hole portions 37a and 37b.

The first holder piece 30a comprises the first light shielding member piece 31a, the second light shielding member piece 32a, the intermediate light shielding member piece 33a, and a support 34a for supporting the pieces. An end of the first light shielding member piece 31a is formed with a plurality of first through hole portions 35a, an end of the second light shielding member piece 32a is formed with a plurality of second through hole portions 36a, and an end of the intermediate light shielding member piece 33a is formed with a plurality of intermediate through hole portions 37a.

The second holder piece 30b comprises the first light shielding member piece 31b, the second light shielding member piece 32b, the intermediate light shielding member piece 33b, and a support 34b for supporting the pieces. An end of the first light shielding member piece 31b is formed with a plurality of first through hole portions 35b, an end of the second light shielding member piece 32b is formed with a plurality of second through hole portions 36b, and an end of the intermediate light shielding member piece 33b is formed with a plurality of intermediate through hole portions 37b.

When the erecting equal-magnification lens array plate 11 is assembled, the first lens array plate 24 and the second lens array plate 26 are sandwiched by the first holder piece 30a and the second holder piece 30b in the lateral direction. This produces the first lens array plate 24 to be inserted between the first light shielding member pieces 31a, 31b and the intermediate light shielding member pieces 33a, 33b, and produces the second lens array plate 26 to be inserted between the second light shielding member pieces 32a, 32b and the intermediate light shielding member pieces 33a, 33b. The first lens 24a is sandwiched by the first through hole portions 35a and 35b with the result that the first lens 24a is laid in the first through hole 35. The fourth lens 26b is sandwiched by the second through hole portions 36a and 36b with the result that fourth lens 26b is laid in the second through hole 36. The second lens 24b and the third lens 26a are sandwiched by the intermediate through hole portions 37a and 37b with the result that the second lens 24b and the third lens 26a are laid in the intermediate through hole 37.

As described above, the erecting equal-magnification lens array plate 11 according to the embodiment is configured such that the holder 30 is divided into two pieces by the splitting plane 40 parallel with the main scanning direction, and the plate is assembled by sandwiching the first lens array plate 24 and the second lens array plate 26 by the first holder piece 30a and the second holder piece 30b in the lateral direction. The first holder piece 30a comprises the first light shielding member piece 31a formed with the first through hole portion 35a, the second light shielding member piece 32a formed with the second through hole portion 36a, and the intermediate light shielding member piece 33a formed with the intermediate through hole portion 37a, the member pieces 31a, 32a, and 33a being formed so as to be integrated. The second holder piece 30b comprises the first light shielding member piece 31b formed with the first through hole portion 35b, the second light shielding member piece 32b formed with the second through hole portion 36b, and the intermediate light shielding member piece 33b formed with the intermediate through hole portion 37b, the member pieces 31b, 32b, and 33b being formed so as to be integrated. Accordingly, steps of aligning the central axes of the first through hole 35, the second through hole 36, and the intermediate through hole 37 are not necessary or at least facilitated in assembling the erecting equal-magnification lens array plate 11. As a result, misalignment of the central axes of the first through hole 35, the second through hole 36, and the intermediate through hole 37 is eliminated or at least mitigated. Accordingly, the optical performance of the erecting equal-magnification lens array plate 11 is improved.

In further accordance with the embodiment, the erecting equal-magnification lens array plate 11 can be assembled only by sandwiching the first lens array plate 24 and the second lens array plate 26 by the first holder piece 30a and the second holder piece 30b. Steps of aligning the optical axes of the convex lenses are not necessary so that the manufacturing cost is reduced.

In the related art, at least three components including the first light shielding member, the second light shielding member, and the third light shielding member are required as light shielding members. Only two components, i.e., the first holder piece 30a and the second holder piece 30b, are necessary to produce the erecting equal-magnification lens array plate 11 according to the embodiment. Since parts count can be reduced, the manufacturing cost is reduced.

In further accordance with the embodiment, the first holder piece 30a and the second holder piece 30b sandwich the first lens array plate 24 and the second lens array plate 26 so that damage to the convex lens resulting from friction between the convex lens and the light shielding member can be reduced.

Figure 4:
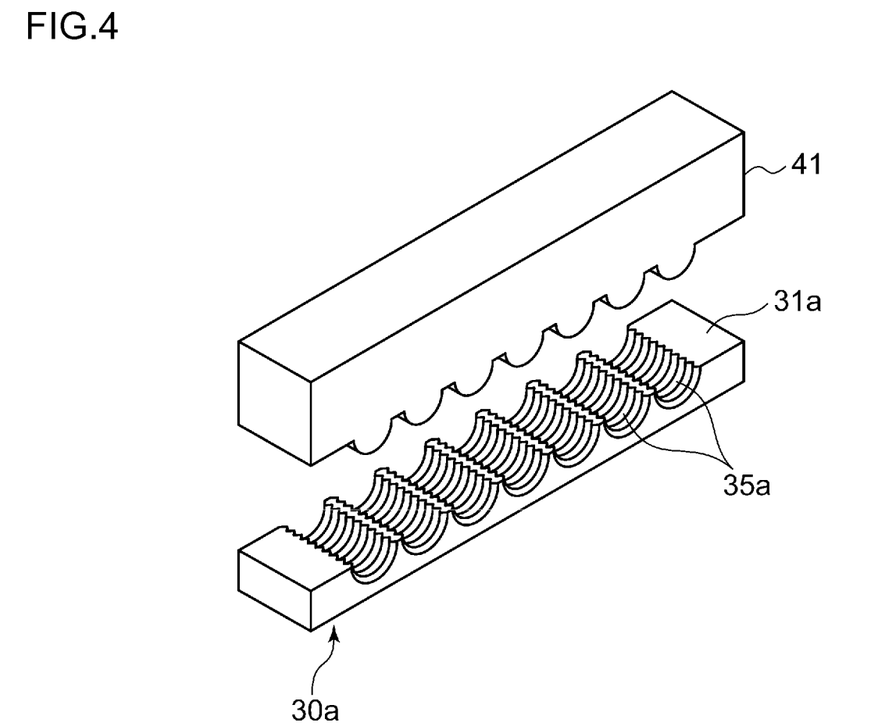
FIG. 4 shows how a holder piece is molded.

FIG. 4 shows how a holder piece is molded. For example, the first holder piece 30a and the second holder piece 30b are formed by, for example, injection molding, using a light shielding material such as black ABS resin. FIG. 4 only shows the first light shielding member piece 31a of the first holder piece 30a. As shown in FIG. 4, in the step of molding the first holder piece 30a grooves may be formed in the interior wall of the first through hole portion 35a by using a metal mold 41. Grooves may of course be formed in the interior wall of other through hole portions such as the second through hole portion. By forming grooves in the interior wall of the through hole portion in this way, light impinging on the interior wall is scattered so that stray light is reduced.

If the through hole is formed as a mere hole as in the related art, it is not easy to form grooves in the interior wall of the through hole. This is because the pin of the metal mold for forming the through hole cannot be removed from the light shielding member. Structurally, the through hole according to the embodiment divided into two pieces so that it is easy to form grooves by using a metal mold, as shown in FIG. 4.

Figure 5:
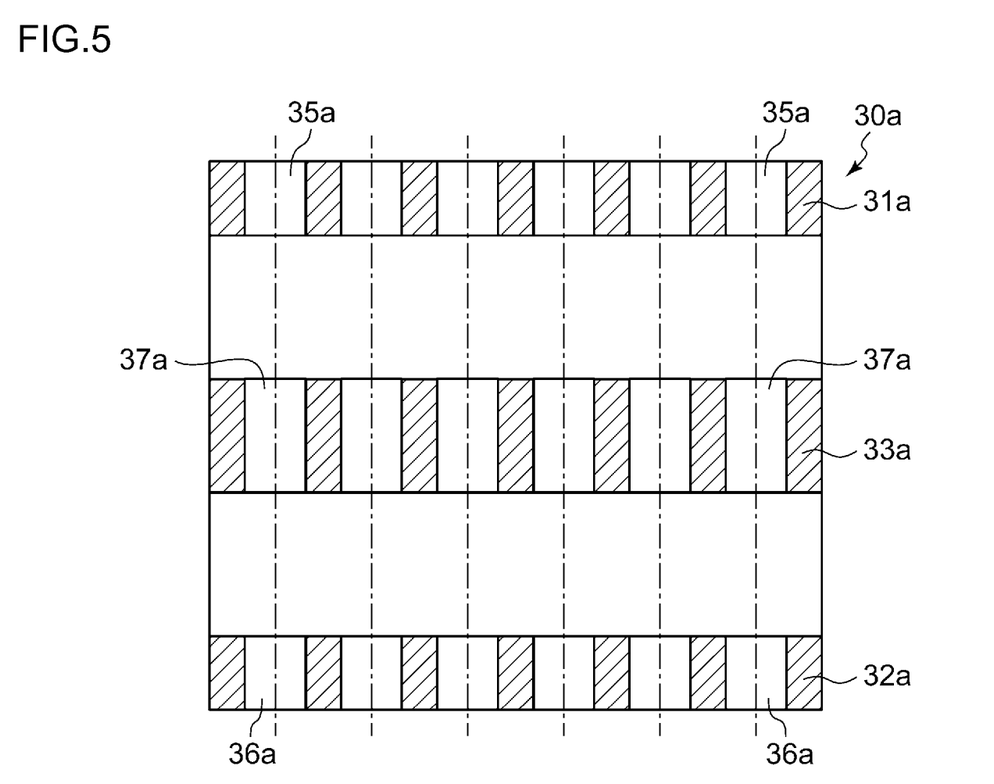
FIG. 5 is a plan view of the holder piece according to one exemplary embodiment.

FIG. 5 is a plan view of the holder piece according to one exemplary embodiment. FIG. 5 is a plan view of the first holder piece 30a by way of example. In the exemplary embodiment shown in FIG. 5, the first through hole portion 35a, the second through hole portion 36a, and the intermediate through hole portion 37a are formed as a semi-circular column. The central axes of the first through hole portion 35a, the second through hole portion 36a, and the intermediate through hole portion 37a are aligned.

Figure 6:
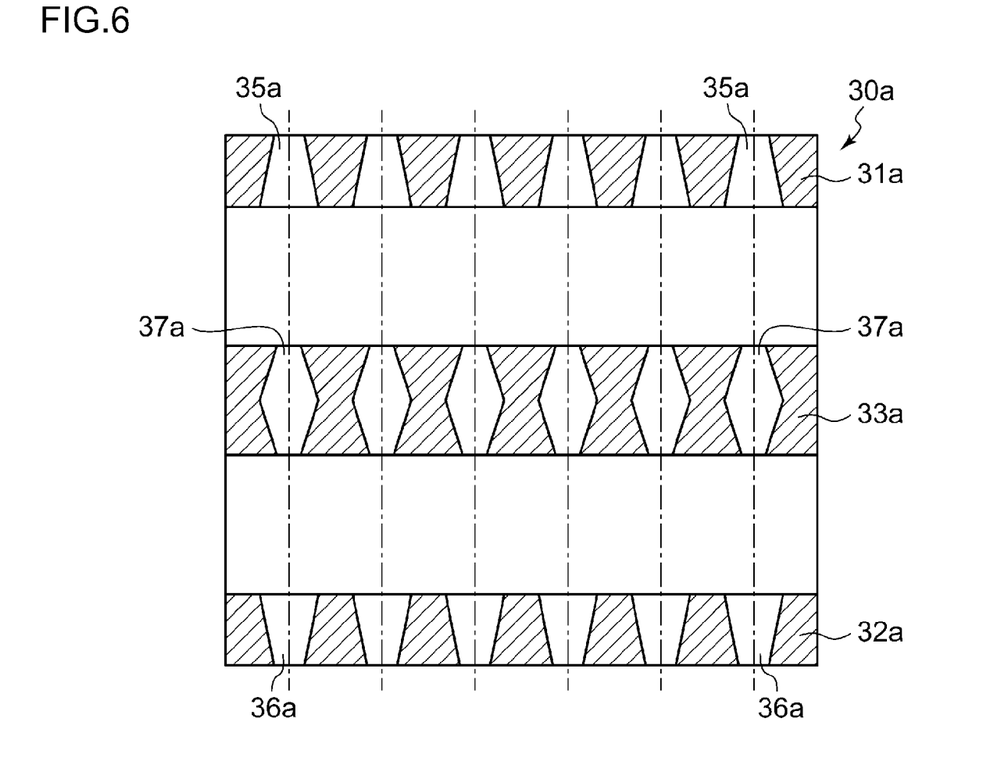
FIG. 6 is a plan view of the holder piece according to another exemplary embodiment.

FIG. 6 is a plan view of the holder piece according to another exemplary embodiment. FIG. 6 is a plan view of the first holder piece 30a by way of example. In the exemplary embodiment shown in FIG. 6, the first through hole portion 35a and the second through hole portion 36a are formed as a semicircular truncated cone. The intermediate through hole portion 37a is formed as two semicircular truncated cones pasted to each other at the bottom. The central axes of the first through hole portion 35a, the second through hole portion 36a, and the intermediate through hole portion 37a are aligned.

If the through hole is formed as a circular cone, the light incident on the interior wall of the through hole at a large angle of incidence is not completely absorbed due to Fresnel reflection, causing stray light. By tapering the through hole as shown in FIG. 6, stray light can be reduced.

As shown in FIGS. 5 and 6, the shape of the through hole portions is non-limiting. The through holes can take any form depending on the optical design. According to the embodiment, it is possible to shape the intermediate through hole portion 37a as shown in FIG. 6. If the through hole is formed as a mere hole, it is not easy to form a through hole of a shape like that of the intermediate through hole portion 37a of FIG. 6. This is because the pin of the metal mold for forming the through hole cannot be removed from the light shielding member. According to the embodiment, the through hole is divided into two pieces by a plane through the central axis. Therefore, through holes of various shapes depending on the desired optical performance can be formed.

Figure 7:
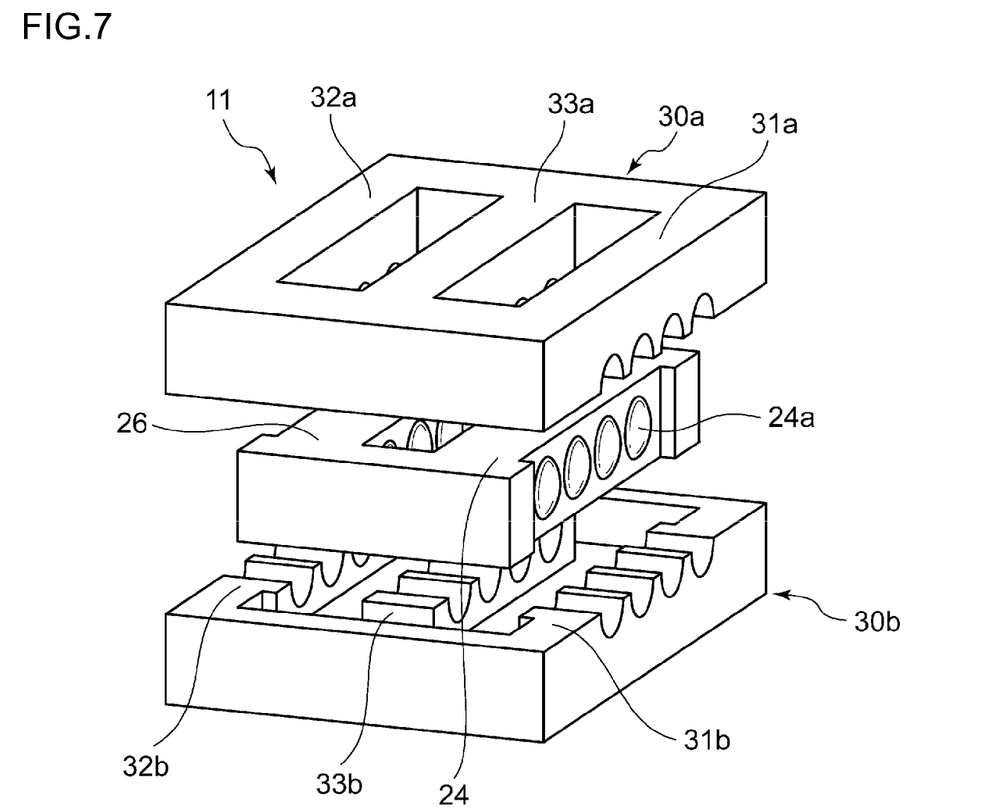
FIG. 7 is a perspective view of the erecting equal-magnification lens array plate according to another embodiment of the present invention.

FIG. 7 is a perspective view of the erecting equal-magnification lens array plate according to another embodiment of the present invention. The erecting equal-magnification lens array plate 11 according to this embodiment differs from the plates of the foregoing embodiments in that the first lens array plate 24 and the second lens array plate 26 are formed so as to be integrated.

By forming the first lens array plate 24 and the second lens array plate 26 as a single piece as in this embodiment, displacement in the optical axes of the first lens array plate 24 and the second lens array plate 26 occurring in the assembling step can be controlled. The number of components of the erecting equal-magnification lens array plate 11 can be reduced so that the cost for components and the cost for assembly can be reduced.

Figure 8A:
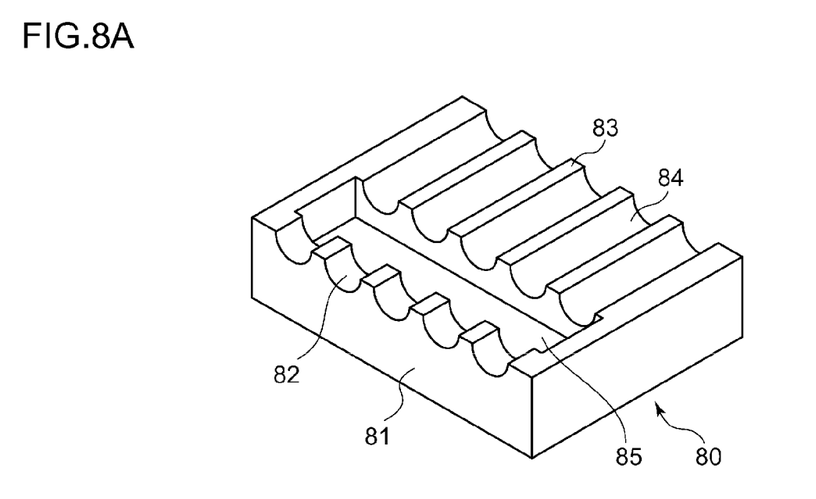
FIGS. 8A-8C show an erecting equal-magnification lens array plate according to still another embodiment of the present invention.
Figure 8B:
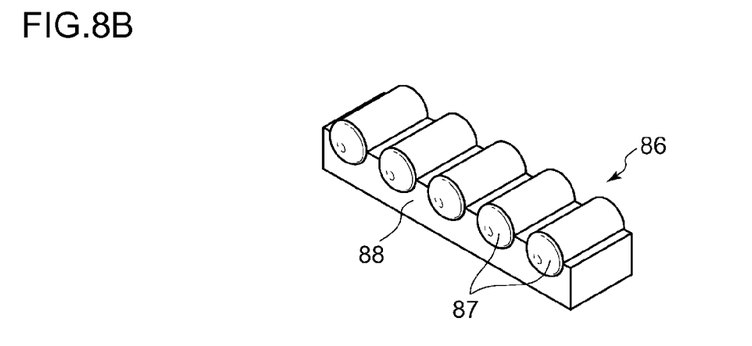
Figure 8C:
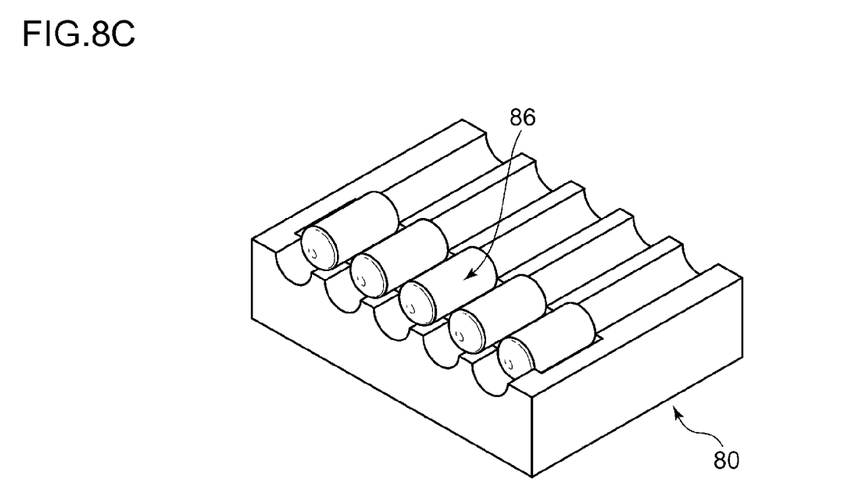

FIGS. 8A-8C show an erecting equal-magnification lens array plate according to still another embodiment of the present invention.

FIG. 8A shows a holder piece 80. According to this embodiment, the holder piece 80 comprises a light shielding member 81 formed with a plurality of through hole portions 82 and an intermediate light shielding member 83 formed with a plurality of intermediate through hole portions 84. A recess 85 in which a half lens array plate shown in FIG. 8B is laid is formed between the light shielding member 81 and the intermediate light shielding member 83.

FIG. 8B shows a half lens array plate 86. The half lens array plate 86 comprises rod lenses 87 arrayed in the main scanning direction. Each lens 87 is supported by a support member 88.

FIG. 8C shows the half lens array plate 86 laid in the holder piece 80. As shown in FIG. 8C, an erecting equal-magnification lens array plate can be formed by manufacturing two sets each comprising the holder piece 80 with the half lens array plate 86 laid therein, and pasting the two sets together.

FIGS. 8A-8C show the holder piece 80 and the half lens array plate 86 formed separately. Alternatively, the holder piece 80 and the half lens array plate 86 may be molded as one piece by using two-color injection molding. This can reduce parts count and the manufacturing cost.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An erecting equal-magnification lens array plate comprising:
    a first lens array plate in which a plurality of lenses are provided on both surface of the plate along the main scanning direction;
    a second lens array plate in which a plurality of lenses are provided on both surface of the plate along the main scanning direction and which is provided to face the first lens array plate;
    a first light shielding member provided on the first lens array plate and provided with a plurality of first through holes located to directly face the lenses on one surface of the first lens array plate;
    a second light shielding member provided on the second lens array plate and provided with a plurality of second through holes located to directly face the lenses on one surface of the second lens array plate; and
    an intermediate light shielding member provided between the first lens array plate and the second lens array plate and provided with a plurality of intermediate through holes located to directly face the lenses on the other surface of the first lens array plate and the lenses on the other surface of the second lens array plate,
    wherein the first light shielding member, the second light shielding member, and the intermediate light shielding member are divided into two pieces by a splitting plane parallel with the main scanning direction,
    wherein one of the first light shielding member pieces, one of the second light shielding member pieces, and one of the intermediate light shielding member pieces produced by dividing the members into two pieces are integrated to form a first holder piece,
    wherein the other of the first light shielding member pieces, the other of the second light shielding member pieces, and the other of the intermediate light shielding member pieces produced by dividing the members into two pieces are integrated to form a second holder piece, and
    wherein the erecting equal-magnification lens array plate is assembled by sandwiching the first lens array plate and the second lens array plate by the first holder piece and the second holder piece.

2. The erecting equal-magnification lens array plate according to claim 1,
    wherein the splitting plane passes through the center of the first through hole, the second through hole, and the intermediate through hole.

3. The erecting equal-magnification lens array plate according to claim 1,
    wherein grooves for scattering incident light are formed in the interior wall of the first through hole, second through hole, and the intermediate through hole.

4. An optical scanning unit comprising:
    a linear light source configured to illuminate a document to be read;
    the erecting equal-magnification lens array plate according to claim 1 configured to condense light reflected by the document to be read; and
    a linear image sensor configured to receive light transmitted by the erecting equal-magnification lens array plate.

5. An image reading device comprising:
    the optical scanning unit according to claim 4; and
    an image processing unit configured to process an image signal detected by the optical scanning unit.

* * * * *